(12) United States Patent
Gevaert

(10) Patent No.: US 10,687,511 B2
(45) Date of Patent: Jun. 23, 2020

(54) ANIMAL FEED SYSTEM FOR SUPPLYING WATER OR FEED

(71) Applicant: MP Group NV, Izegem (BE)

(72) Inventor: Sabine Gevaert, Bredene (BE)

(73) Assignee: MP Group nv, Izegem (BE)

( * ) Notice: Subject to any disclaimer, the term of this patent is extended or adjusted under 35 U.S.C. 154(b) by 182 days.

(21) Appl. No.: 15/888,139

(22) Filed: Feb. 5, 2018

(65) Prior Publication Data

US 2019/0216050 A1    Jul. 18, 2019

(30) Foreign Application Priority Data

Jan. 12, 2018   (BE) .................................. 2018/5017

(51) Int. Cl.
*A01K 5/02* (2006.01)
*A01K 7/02* (2006.01)

(52) U.S. Cl.
CPC .............. *A01K 5/0225* (2013.01); *A01K 7/02* (2013.01)

(58) Field of Classification Search
CPC .......... A01K 5/01; A01K 5/10; A01K 5/0114; A01K 5/0225; A01K 5/0233; A01K 5/0241; A01K 7/00; A01K 7/005; A01K 7/02; A01K 7/025; A01K 7/06
USPC ........................ 119/51.01, 52.1, 53, 53.5, 54
See application file for complete search history.

(56) References Cited

U.S. PATENT DOCUMENTS

| 1,835,964 | A | | 12/1931 | Pech | |
| 4,840,143 | A | * | 6/1989 | Simon | A01K 5/0225 |
| | | | | | 119/52.1 |
| 6,477,981 | B1 | | 11/2002 | Harper | |
| 7,146,930 | B1 | * | 12/2006 | Ness | A01K 7/02 |
| | | | | | 119/77 |
| 8,555,816 | B2 | * | 10/2013 | Weber | A01K 7/025 |
| | | | | | 119/74 |
| 2010/0050950 | A1 | * | 3/2010 | Graves | A01K 7/005 |
| | | | | | 119/81 |
| 2011/0239950 | A1 | * | 10/2011 | Harper | A01K 7/02 |
| | | | | | 119/74 |
| 2011/0247565 | A1 | * | 10/2011 | Northrop | A01K 5/0135 |
| | | | | | 119/61.54 |
| 2012/0125263 | A1 | | 5/2012 | Northrop | |
| 2012/0132144 | A1 | | 5/2012 | Parks | |

FOREIGN PATENT DOCUMENTS

GB        2241633 A        9/1991

* cited by examiner

*Primary Examiner* — Peter M Poon
*Assistant Examiner* — Danielle A Clerkley
(74) *Attorney, Agent, or Firm* — James Creighton Wray

(57) ABSTRACT

The invention concerns an animal feed system (1) suitable for supplying feed or water, comprising:
- a freely rotatable holder (2) for feed or water with a discharge opening (3) provided in the underside;
- a catchment tray (4) for supporting the holder (2) and capturing and temporarily storing the feed or water dispensed via the discharge opening (3);
- fixing means intended to attach the holder (2) to the catchment tray (4), wherein the fixing means comprise an annular fixing element (5) with security edge (6), wherein said fixing element (5) comprises a passage (7) for the feed or water.

6 Claims, 3 Drawing Sheets

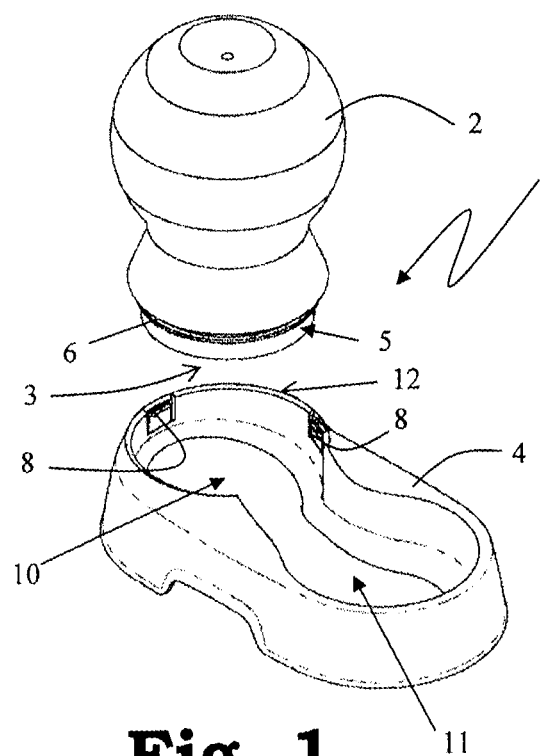
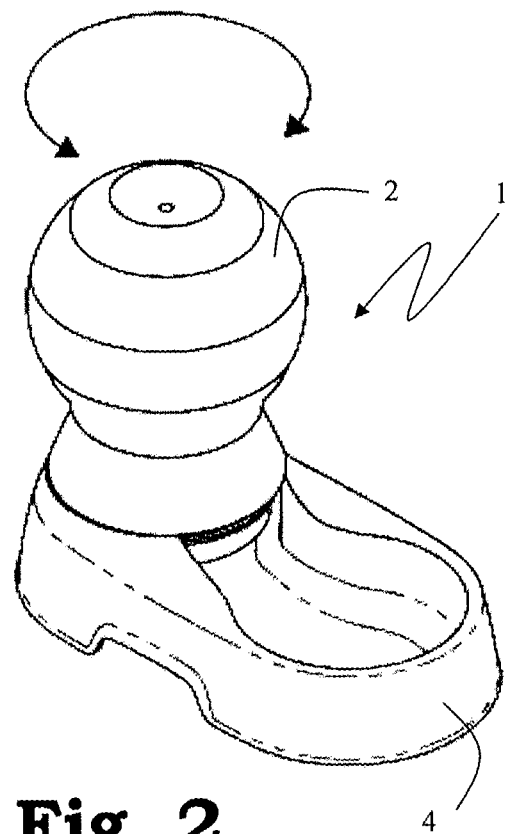
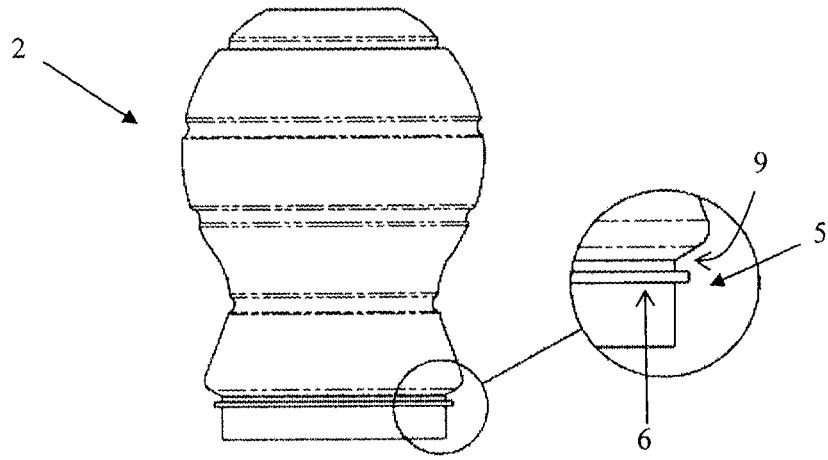
Fig. 1
Fig. 2
Fig. 3

ANIMAL FEED SYSTEM FOR SUPPLYING WATER OR FEED

The invention concerns an animal feed system suitable for supplying feed or water, comprising:
- a freely rotatable holder for feed or water with a discharge opening provided in the underside;
- a catchment tray for supporting the holder and capturing and temporarily storing the feed or water dispensed via the discharge opening;
- fixing means intended to attach the holder to the catchment tray.

The animal feed system according to the invention is particularly suitable for dispensing either dry feed, preferably in the form of animal feed kibbles, or liquid foodstuffs, such as for example water or another suitable liquid for domestic pets, preferably cats. Evidently, other pets such as dogs, rabbits, rodents, reptiles, birds, amphibians etc. may be fed with this system.

Such animal feed systems are freely known and use gravity to continuously direct the material present in the holder (e.g. kibbles or water) to the catchment tray. Thus a greater quantity of feed is available, and owners of pets need feed them less often.

In the known systems however, it is important that the holder is mounted correctly on the catchment tray; often, this is only possible in a specific orientation of the holder relative to the catchment tray, whereby it is sometimes difficult to mount the holder correctly on the catchment tray.

It is an object of this invention to create an animal feed system which allows the holder to be mounted easily and quickly on the catchment tray.

The object of the invention is achieved by the provision of an animal feed system suitable for supplying feed or water, comprising:
- a freely rotatable holder for feed or water with a discharge opening provided in the underside;
- a catchment tray for supporting the holder and capturing and temporarily storing the feed or water dispensed via the discharge opening;
- fixing means intended to attach the holder to the catchment tray, wherein the fixing means comprise an annular fixing element with security edge, wherein said fixing element comprises a passage for the feed or water. The fixing element ensures the connection (lock) between the holder and the catchment tray. Due to its shape (annular) and the presence of the security edge (flange), it is possible to mount the holder easily on the catchment tray without the holder needing to be oriented in a specific position relative to the catchment tray. The fixing means are provided such that the holder is fixed so as to be freely rotatable on the catchment tray. The holder is preferably bottle-shaped. Preferably, the discharge opening has a width of minimum 50 mm and maximum 150 mm. A discharge opening with a diameter of 110 mm is preferred. This discharge opening is provided so that the inner walls of the holder can easily be cleaned by hand or using a brush. Via the discharge opening, the holder can also be filled with feed or water.

In an advantageous embodiment of the animal feed system according to the invention, the fixing means comprise one or more clip fingers which are intended to form a clip connection with the security edge of the fixing element. Preferably, three clip fingers are provided to achieve an adequate locking and stable positioning of the holder on the catchment tray.

In a more advantageous embodiment of the animal feed system according to the invention, the holder has a supporting wall and the catchment tray furthermore has a receiving part and a feed capture part, wherein in the connected position, the holder with its supporting wall is freely rotatable on the upper edge of the receiving part. The receiving part is intended to support the holder. Preferably, the receiving part and the feed capture part are connected to each other. In a preferred embodiment, the receiving part and the feed capture part are configured as a dish.

In a first preferred embodiment, the animal feed system comprises two basic elements, namely a holder and a catchment tray, wherein said fixing element either forms an integral part of the holder or forms an integral part of the catchment tray. In an alternative embodiment, the animal feed system comprises three basic elements, namely a holder, a catchment tray and a separate fixing element which is provided releasably, preferably via a screw connection, on the holder or catchment tray. In a preferred embodiment, the fixing element is releasably connected to the holder, preferably in the vicinity of the discharge opening.

The holder of the animal feed system according to the invention may be filled with animal feed or with a fluid (usually water). In the embodiment in which the holder is filled with water (or other fluid), the passage of the fixing element is preferably provided with a displaceable flap body to prevent leakage of water from the holder to the catchment tray. In practice, the flap body comprises a disc-like base body which is placed in the opening, and a protruding part which, when the holder is placed on the catchment tray, extends up to a part of the catchment tray such that the disc-like base body is slightly tilted, whereby water from the holder can flow to the catchment tray.

In a number of the known animal feed systems in which the holder is filled with animal feed, primarily dry animal feed in the form of kibbles or other similar granulates, often problems arise in dispensing the animal feed because this becomes stuck at the level of the discharge opening. To avoid this, in an alternative embodiment of the animal feed system, this invention provides that the passage of the fixing element is provided with a number of radially extending transport arms which are suitable for transporting animal feed in the direction of the catchment tray. When the holder is rotated, the fixing element with its transport arms also rotates, whereby the feed moves more easily to the catchment tray.

According to a particular embodiment of the animal feed system according to this invention, the top side of the holder comprises a closable supply opening. Via this supply opening, the holder can be filled more easily. The supply opening is preferably opposite the discharge opening.

The invention is now explained in more detail below with reference to the following detailed description of a number of preferred embodiments of an animal feed system according to the invention. The aim of this description is exclusively to give clarifying examples and indicate further advantages and features of the system, and may thus not be interpreted as a restriction of the area of application of the invention or of the protected rights claimed in the claims.

In this detailed description, by means of reference signs, reference is made to the attached drawings in which:

BRIEF DESCRIPTION OF THE DRAWINGS

FIG. 1: is a perspective depiction of the animal feed system according to the invention in the disconnected (unlocked) state, wherein the connecting element is provided integrally on the holder;

FIG. 2: is a depiction of the embodiment presented in FIG. 1 in the connected (locked) state;

FIG. 3: is a detailed view of the connecting element with security edge;

DETAILED DESCRIPTION

Figure 4:
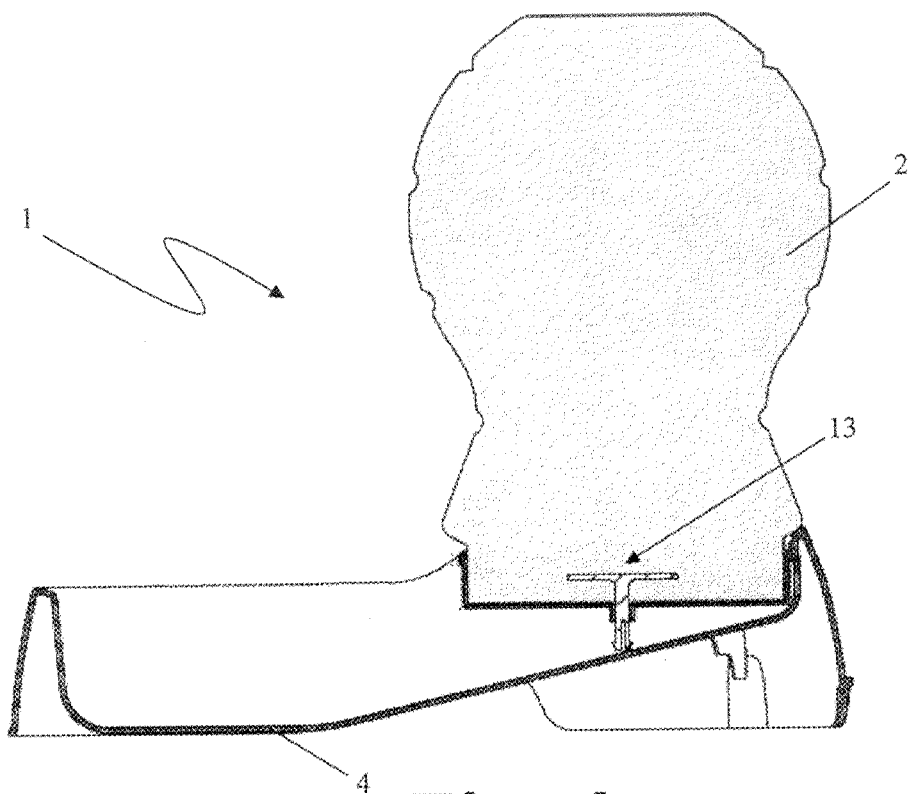
FIG. 4: is a depiction of an animal feed system specifically suited for supplying water or other fluids, wherein the connecting element is releasably provided on the holder.

The animal feed system (1) according to this invention and as depicted in the attached figures comprises:
- a freely rotatable holder (2) for feed or water with a discharge opening (3) provided in the underside;
- a catchment tray (4) for supporting the holder (2) and capturing and temporarily storing the feed or water dispensed via the discharge opening (3);
- fixing means intended to attach the holder (2) to the catchment tray (4).

In order to mount the holder (2) easily on the catchment tray (4), wherein no specific orientation is required of the holder (2) relative to the catchment tray (4), the fixing means comprise an annular fixing element (5) with security edge (6). Here, the passage (7) for the feed or water is provided in the fixing element (5). The fixing element (5) creates the connection (lock) between the holder (2) and the catchment tray (4). Consequently, the fixing element (5) is also provided between the discharge opening (3) and the catchment tray (4).

Figure 7:
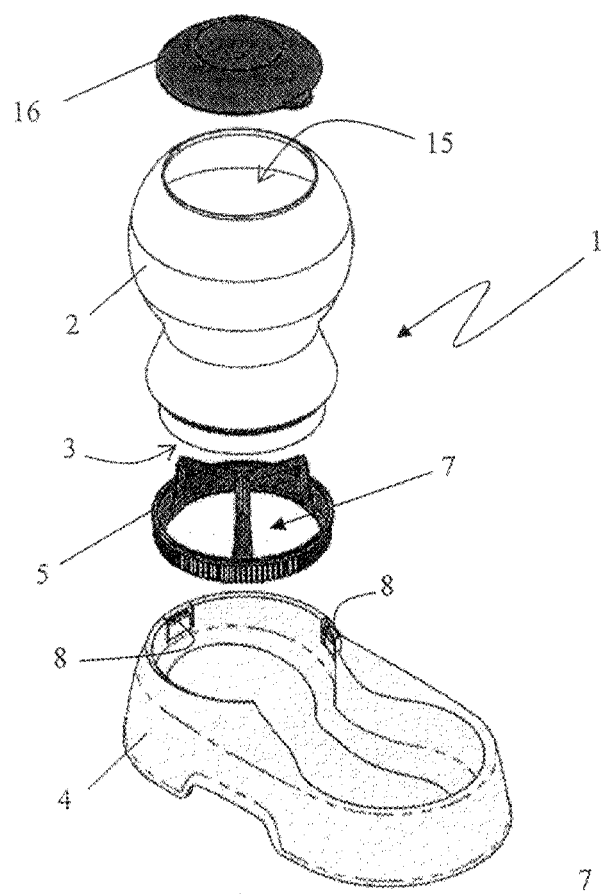
FIG. 7: is an exploded view of an animal feed system specifically suited for supplying animal feed kibbles, wherein the connecting element is releasably provided on a holder with a closable supply opening.
Figure 8:
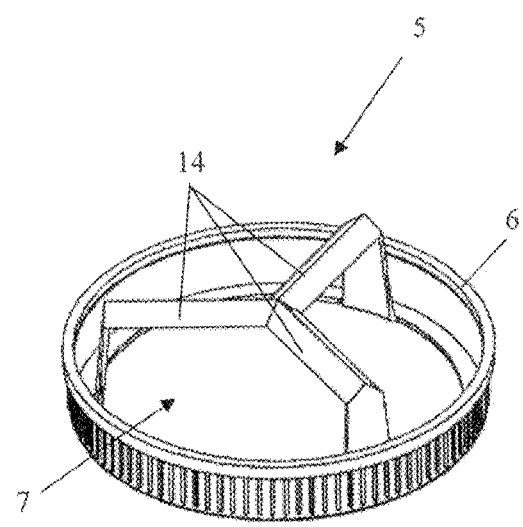
FIG. 8: is a perspective depiction of the fixing element with radially extending transport arms and is suitable for placing on a holder for animal feed.

Depending on the shape and/or size of the passage (7), the animal feed system (1) is suitable for dispensing animal feed, usually in the form of kibbles, or for dispensing water or another suitable fluid for animals. As standard, the fixing element (5) has an annular peripheral wall, as shown in FIGS. 7 and 8, and the passage (7) is limited by this peripheral wall. This embodiment is particularly suitable for holders (2) intended to be filled with animal feed. To guide the discharge of animal feed, the passage (7) of the fixing element (5) is furthermore provided with a number of radially extending transport arms (14) which guide the animal feed in the direction of the catchment tray (4) when the holder (2) is rotated. The holder (2) is rotatable clockwise and counterclockwise. In the embodiment shown in FIGS. 7 and 8, three transport arms (14) are provided. Evidently, the number of transport arms (14) may be higher (four, five or six) or lower (one or two).

Figure 5:
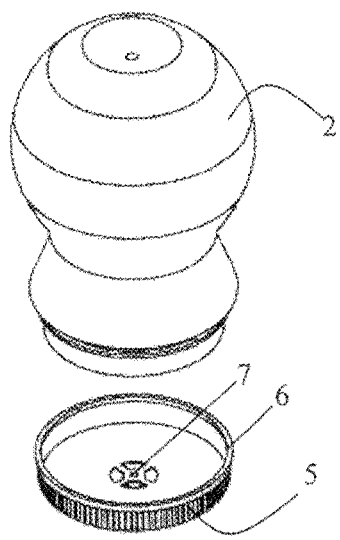
FIG. 5: is a depiction of the holder and the annular fixing element which may be placed thereon.

When the holder (2) is intended to be filled with water (see for example FIGS. 4 and 5), a base wall part is also present which is limited by the peripheral wall. A small opening is provided, preferably centrally, in the base wall part, which forms a passage (7) for the water. In this embodiment, the passage of the fixing element (5) is also provided with a movable flap body (13) in order to prevent or reduce the supply of water from the holder (2) to the catchment tray (4). In practice, the flap body (13) comprises a disc-like base body which is provided in the opening, and a protruding part which, in the usage position when the holder (2) is placed on the catchment tray (4), extends up to a part of the catchment tray (4) so that the disc-like base body is slightly tilted, whereby the opening is cleared and a passage is formed for allowing water to flow gradually out of the holder to the catchment tray. When the holder (2) is removed from the catchment tray, the flap body closes the opening and there is no longer a passage for the water.

In a first embodiment, the animal feed system (1) according to this invention comprises two basic elements, namely a holder (2) and a catchment tray (4), wherein said fixing element (5) either forms an integral part of the holder (see FIGS. 1 to 3) or forms an integral part of the catchment tray (4). In the case where the fixing element (5) forms an integral part of the holder (2), the passage (7) for animal feed is formed by the discharge opening (3).

In an alternative embodiment (FIGS. 4 to 8), the animal feed system (1) comprises three basic elements, namely a holder (2), a catchment tray (4) and a separate fixing element (5) which is provided releasably, preferably via a screw connection, on the holder (2) or the catchment tray (4). In the embodiments shown (FIGS. 4 to 8), the fixing element (5) is releasably provided on the holder (2). For this, the edge of the holder (2) in the vicinity of the discharge opening (3) is provided with screw threads for fixing of the fixing element (5).

The holder (2) is preferably bottle-shaped with a discharge opening (3) between 50 mm and 150 mm in size. A discharge opening (3) with such dimensions allows the inner walls of the holder (2) to be cleaned easily. As FIG. 7 shows, the top side of the holder (2) may also be provided with a closable supply opening (15), through which the holder (2) is filled. The supply opening is closed by means of a cover (16).

The holder (2) is made of polyethylene terephthalate (PET) and is formed by blow moulding. The catchment tray (4) is formed by injection moulding and is preferably made of polypropylene. The catchment tray (4) comprises a receiving part (10) and a feed capture part (11) which are designed in the form of dishes and are connected with each other so that the animal feed or water supplied from the holder (2) simply enters the feed capture part (11) to which the animals have easy access.

Figure 6:
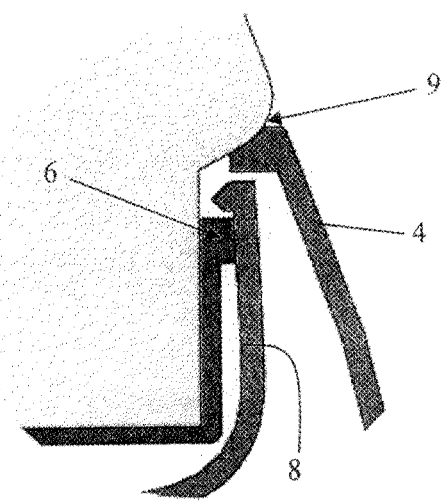
FIG. 6: is a detailed depiction of the clip connection between the connecting element and a clip finger provided on the catchment tray.

The holder (2) furthermore has a supporting wall (12) wherein, in the connected position shown on FIG. 6, the holder (2) with its supporting wall (12) is provided freely rotatably on the upper edge (12) of the receiving part (10) of the catchment tray (4). The receiving part (10) is thus provided to support the holder (2).

In the connected (locked) position, the holder (2) is connected to the catchment tray (4) by a clip connection. This clip connection, as shown from FIG. 6, is achieved because the fixing element (5) comprises a security edge (6), and the catchment tray (4) has a number of clip fingers (8) (lips) which can be pressed in and which grip and clip over the security edge.

The connection of the holder to the catchment tray is simple when this clip connection is used, and also no tools are required: the holder (2) is simply placed on the catchment tray (4) at the level of the receiving part (10), and then pressed down so that the clip fingers (8) grip the security edge (6).

Figure 9:
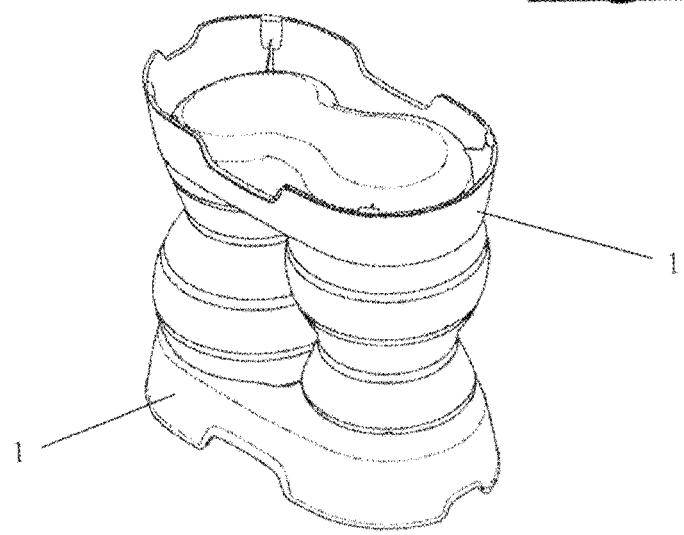
FIG. 9: is a depiction of two animal feed systems fitting together for storage or transport.

The animal feed system (1) according to this invention, as shown in FIG. 9, is designed to be packed together (in twos), such that the volume taken up is smaller than if they were packed separately.

The invention claimed is:

1. Animal feed system (1) suitable for supplying feed or water, comprising:
    a freely rotatable holder (2) for feed or water with a discharge opening (3) provided in the underside;
    a catchment tray (4) for supporting the holder (2) and capturing and temporarily storing the feed or water dispensed via the discharge opening (3);
    fixing means intended to attach the holder (2) to the catchment tray (4),
wherein the fixing means comprise an annular fixing element (5) with a retaining edge (6) for locking between the rotatable holder (2) and the catchment tray (4), wherein said fixing element (5) comprises a passage (7) for the feed or water and wherein the fixing element (5) is releasably connected to the holder (2) so that in a locked state, the holder (2) and the fixing element (5) are rotatable together in relation to the catchment tray (4).

2. Animal feed system (1) according to claim 1, wherein the fixing means comprise one or more clip fingers (8) which are intended to form a clip connection with the retaining edge (6) of the fixing element (5).

3. Animal feed system (1) according to claim 1 wherein the holder (2) has a supporting wall (9) and that the catchment tray (4) has a receiving part (10) and a feed capture part (11), wherein in the connected position, the holder (2) with its supporting wall (9) is provided so as to be freely rotatable on the upper edge (12) of the receiving part (10).

4. Animal feed system (1) according to claim 1, wherein the passage (7) of the fixing element (5) is provided with a displaceable flap body (13) to prevent leakage of water from the holder (2) to the catchment tray (4).

5. Animal feed system (1) according to claim 1, wherein the passage (7) of the fixing element (5) is provided with a number of radially extending transport arms (14) which are suitable for transporting animal feed in the direction of the catchment tray (4).

6. Animal feed system (1) according to claim 1, wherein a top side of the holder (2) comprises a closable supply opening (15).

* * * * *